(12) United States Patent
Petzold

(10) Patent No.: US 6,466,865 B1
(45) Date of Patent: Oct. 15, 2002

(54) METHOD FOR INPUTTING TRAVEL DESTINATIONS INTO A NAVIGATION SYSTEM

(75) Inventor: Bernd Petzold, Wunstorf (DE)

(73) Assignee: Robert Bosch GmbH, Stuttgart (DE)

( * ) Notice: Subject to any disclaimer, the term of this patent is extended or adjusted under 35 U.S.C. 154(b) by 0 days.

(21) Appl. No.: 09/831,856

(22) PCT Filed: Nov. 15, 1999

(86) PCT No.: PCT/DE99/03644

§ 371 (c)(1),
(2), (4) Date: Sep. 28, 2001

(87) PCT Pub. No.: WO00/30057

PCT Pub. Date: May 25, 2000

(30) Foreign Application Priority Data

Nov. 16, 1998 (DE) .......................................... 198 52 660

(51) Int. Cl.[7] .............................................. G01C 21/00
(52) U.S. Cl. .................... 701/202; 701/211; 701/25; 701/28; 340/995; 342/357.13
(58) Field of Search ................................. 701/200, 202, 701/211, 213, 25, 28; 73/178 R; 340/988, 990, 995; 342/357.08, 357.1, 357.13

(56) References Cited

U.S. PATENT DOCUMENTS 5,944,769 A    8/1999    Fitzgerald, II et al. ..... 701/201

FOREIGN PATENT DOCUMENTS

| DE | 196 40 068 | 4/1998 |
|----|------------|--------|
| DE | 198 52 660 | 3/2001 |
| EP | 0 747 670  | 12/1996 |
| EP | 0 766 217  | 4/1997 |
| EP | 0 803 708  | 10/1997 |
| EP | 0 829 704  | 3/1998 |
| JP | 01-287414  | 11/1989 |
| JP | 09-210711  | 8/1997 |
| WO | WO 97/18440 | 5/1997 |

OTHER PUBLICATIONS

G.L. Graef: "Graphics Formats. A Close Look At GIF, TIFF, and Other Attempts At A Universal Image Form T", BYTE, US, McGraw–Hill Inc. St. Peterborough, vol. 14, No. 9, Sep. 1, 1989, pp. 305–306, 308–310.

W. Li et al.: "Vector–Based Signal Processing An Quantization For Image And Video Compression", Proceedings Of The IEEE, US, IEEE, New York, vol. 83, No. 2, Feb. 1, 1995, pp. 317–334.

Berlin Travel Pilot RG 05, Blaupunktwerke GmbH Hildesheim.

*Primary Examiner*—Yonel Beaulieu
(74) *Attorney, Agent, or Firm*—Kenyon & Kenyon

(57) ABSTRACT

A device is described for inputting a travel destination into a navigational device used for navigating a motor vehicle in a road network. The inputting device suggests travel destinations to the user, according to predefined criteria, by displaying images of the travel destinations. By choosing an image, the user can select a travel destination.

12 Claims, 3 Drawing Sheets

METHOD FOR INPUTTING TRAVEL DESTINATIONS INTO A NAVIGATION SYSTEM

FIELD OF THE INVENTION

The present invention relates an input device for inputting travel destination into a navigational device.

BACKGROUND INFORMATION

A device for the input of a travel destination into a navigational device is described in, for example, Operating Instructions "Berlin Travel Pilot RG 05", Blaupunktwerke GmbH, Hildesheim. In this device, travel destinations are presented to the user in pure text form for his selection of a travel destination, that is, designations of travel destinations are given

SUMMARY

The device for input according to the example embodiment of the present invention has the advantage that the user is shown, via an optical output, an image for each of a plurality of possible travel destinations. In that way, the user can inform himself better on possible travel destinations. In addition, it is now not required that the user know the name or address of a travel destination. It is sufficient if he is familiar with the optical appearance. This is especially an advantage with hotels and restaurants whose names may change, and with tourist attractions such as castles or museums, whose outer appearance may be better known than their exact name designation.

It is also advantageous that a plurality of images can be simultaneously indicated on the optical display, so that a comparison can be made by the user between possible travel destinations.

It is also advantageous that the images that can be shown can be supplemented by text information. That gives the user the possibility to inform himself on the name of the illustrated travel destination. It is also possible to obtain more extensive data, for example, the rates of a hotel or the day a museum is closed can be given.

Furthermore, it is advantageous that one of the criteria for retrieval of the images is a predefined distance of a travel destination. This can avoid the output of too many possible travel destinations, and thus clarity can remain assured to the user. Furthermore, it is advantageous that one of the criteria for retrieval of the images is that a travel destination belongs to a selectable category of travel destinations. Through this, the search by the user can be speeded up because it can limit itself to a category depending on the choice of the user, as, for instance, hotels or museums.

It is further advantageous that the images can be retrieved at least partially via a radio connection. For one thing, the user can retrieve updated images via the radio connection. Furthermore, in this manner, the required storage space, which has to be present in a vehicle equipped with this device, can be reduced.

Another advantage is that a plurality of images can be brought in via an exchangeable data carrier of the device. This data carrier can have selected travel destinations, in line with the user's travel intentions, put on it even before the trip starts.

It is advantageous, too, that the images are photographically realistic pictures, since a high recognition value of the object is fulfilled for the user.

It is advantageous that the images are simplified illustrations of the travel destination, but yet they show individual features of the travel destination. Thereby the storage space requirement of the stored image can be reduced, but individual recognition by a user in the light of individual features remains possible.

It is advantageous, furthermore, that, for different times of the day, different images of a travel destination are stored and that the output of the image depends on the time of day, in order to improve the recognition by a user. For it is true that travel destinations can look very different according to what time of day it is. A building, which, for example, is illuminated at night can change tremendously compared to its illumination by daylight.

DETAILED DESCRIPTION

Figure 1:
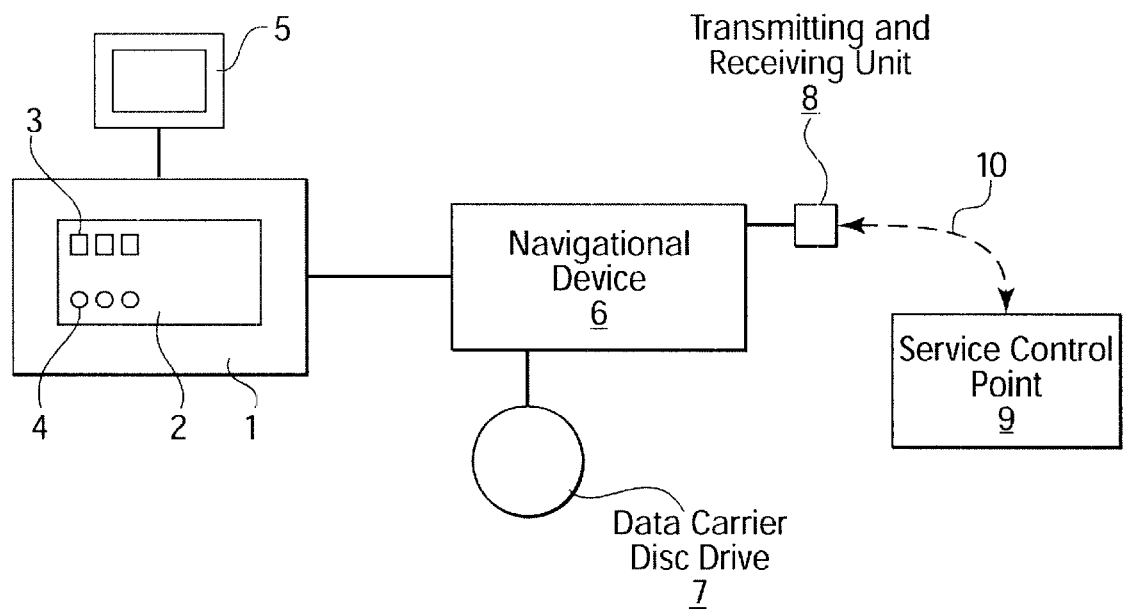
FIG. 1 a device according to an example embodiment of the present invention for inputting travel destinations into a navigational device.

In FIG. 1, a device according to an example embodiment of the present invention for inputting a travel destination into a navigational device is represented. An input device 1 has a control panel 2 furnished with push-buttons 3 and/or rotary knobs 4. An optical display 5 is mounted on the device. The device 1 is connected to a navigational device 6. The navigational device 6 has a disc drive for a data carrier 7 and a transmitting and receiving unit 8. Between the transmitting and receiving unit 8 and a service control point 9 there is at least one radio connection 10.

When the user of a vehicle wants to begin his trip and input a travel destination into navigational device 6, he can call up an operating menu on optical display 5 using control panel 2 and the push-buttons 3 and/or rotary knobs 4 positioned on it. Optical display 5 shown in this and the following figures is here preferably a liquid crystal display mounted in the middle of the vehicle. This can also be a display unit placed in the area of the vehicle instruments in front of the driver, especially a freely programmable KOMMI instrument, in which the menu can be called up. Now the driver can stipulate criteria on the control panel, according to which possible travel destinations are to be shown on optical display unit 5. With regard to this, it is possible to have displayed travel destinations within the maximal distance from the current position of the vehicle. Then again, possible travel destinations can be output according to specified categories, e.g., hotels, restaurants, museums, tourist attractions, car parks and repair garages. When the user picks a criterion, he is offered either a further selection possibility so as to further refine the search, or he is shown travel destinations at once as image information. The user can now change among the individual images using control panel 2, and, also using control panel 2, can select a travel destination. The image data may be made available by a data carrier which is present in the data carrier disc drive 7. This data carrier disc drive represents a possible memory unit from which the image data can be retrieved. In addition, supplementary text data can be stored here. Furthermore, images can be retrieved via transmitting and receiving unit 8 over radio connection 10 from service control point 9, that is, from a memory unit outside the vehicle, and can be relayed via navigational device 6 to the device for input.

Data on the travel destination are relayed by the device for input into the navigational device. This has available to it a unit for travel route calculation not shown in the drawing, as well as vehicle sensors and a GPS receiver not shown in the drawing, which make possible ascertaining the vehicle position. The actually ascertained vehicle position is relayed to the device for input 1 even before selection of the travel destination, so as to allow display of possible travel destinations at a certain distance from the actual vehicle position. The possible travel destinations are linked with positions in a digital map which may be entered into navigational device 6 via a data carrier in the data carrier disc drive 7. Such a position can be represented in the digital map by a point, a vector or an area. The data carrier may be, for example, a CD or a DVD. The radio communication may be carried out, e.g., via DAB (digital audio broadcasting), DMB (digital multimedia broadcasting) or a GSM connection (global system for mobile communications). For this, an already present GSM receiver and transmitter device of a possibly already present automobile telephone, or a DAB receiver as well as a DMB receiver can be jointly used. The travel route calculated by the navigational device is read out to the user via an audio output, not shown in the drawing, or via an optical output, in dependence on the actual vehicle position. Optical output 5 can also be used for output of the calculated travel route or for the output of travel instructions.

Figure 2:
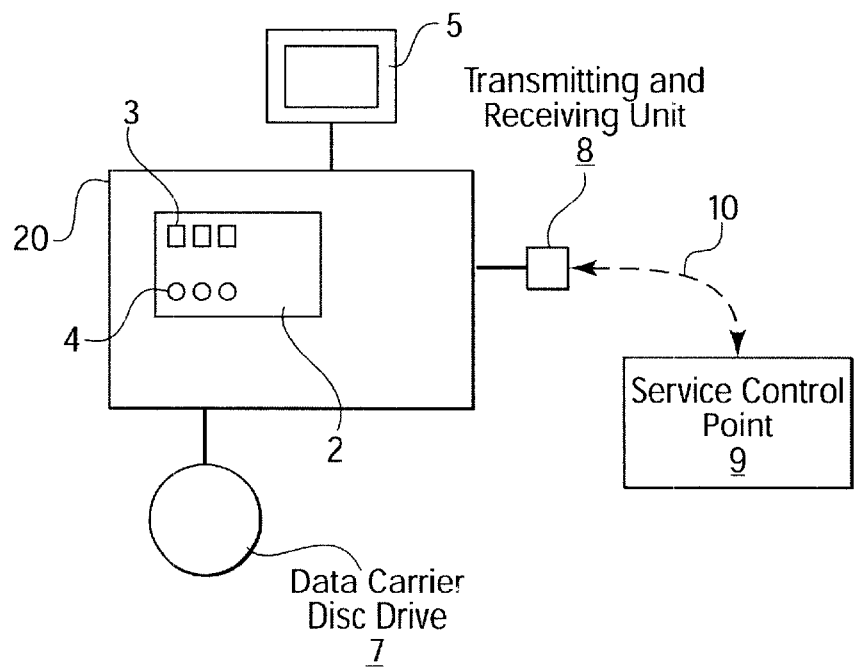
FIG. 2, FIG. 3 and FIG. 4 show further input devices according to example embodiments of the present invention.

FIG. 2 shows a device according to according to another example embodiment the present invention for inputting a travel destination into a navigational device 20 is integrated. The navigational device 20 has a control panel 2 having push-buttons 3 and/or rotary knobs 4, as well as an optical display 5. Furthermore, a data carrier disc drive 7 and optionally a transmitting and receiving device 8 are present, using which, radio communication 10 of the navigational device 20 with a service control point 9 is possible. The functions correspond to the exemplary embodiment in FIG. 1. In the example embodiment of FIG. 2, however, input unit 1 in FIG. 1 is permanently integrated into navigational device 20.

Figure 3:
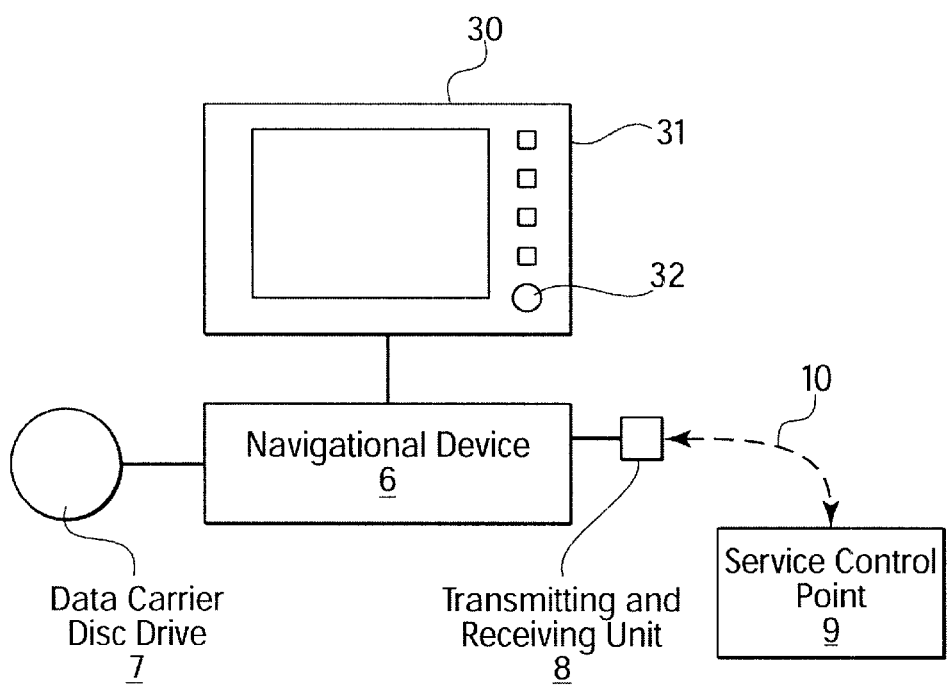

A further exemplary embodiment according to the present invention is shown in FIG. 3. In this example embodiment, the control panel of the device for input is integrated into optical display 30. Push-buttons 31 and/or rotary knobs 32 are present. Optical display 30 is also connected to navigational device 6. Navigational device 6 again has a data carrier disc drive 7 as well as a transmitting and receiving unit 8 for creating radio communication 10 to a service control point. The exemplary embodiment in FIG. 3 differs from the exemplary embodiment in FIG. 1 in that control panel 2 in FIG. 1 is integrated into optical display 5 in FIG. 1 and is adjusted to the dimensions of the optical display. The remaining functions are the same.

Figure 4:
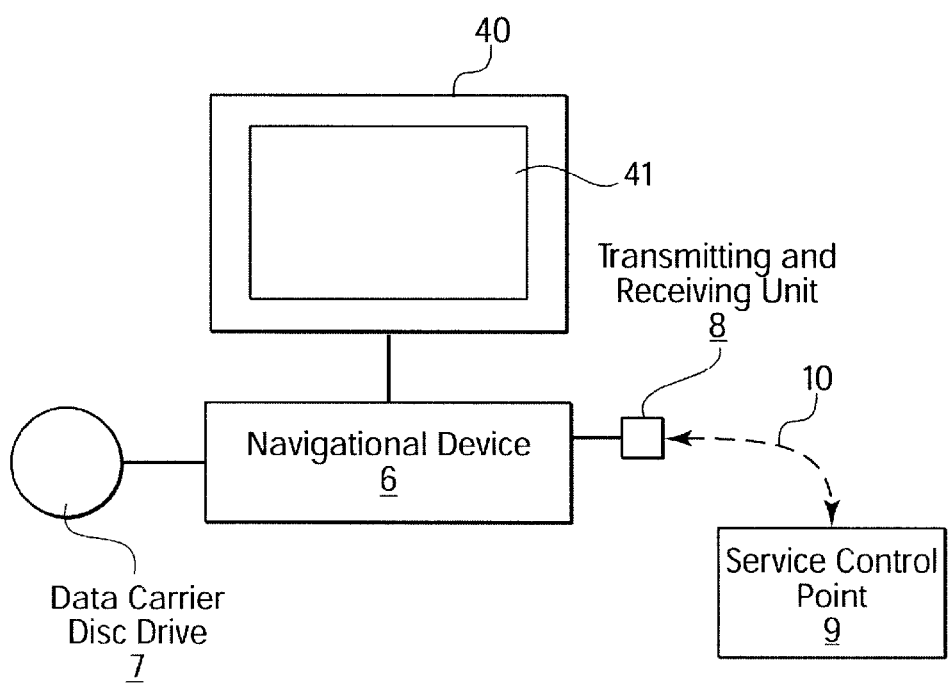

A further exemplary embodiment according to the present invention is shown in FIG. 4. Optical display 40 is designed as a touch screen monitor. Menu control and selection of a travel destination take place via a touch-sensitive display surface 41 which takes the place of the control panel. A travel destination is selected by touching it as depicted on display surface 41. Optical display 40 is designed with a navigational device 6, a data carrier disc drive 7 and a transmitting and receiving unit 8 which is used to produce radio communications 10 to a service control point. The exemplary embodiment in FIG. 4 differs from the exemplary embodiment in FIG. 3 in that keys 31 and/or rotary knobs 32 are omitted, and instead, the user operates (the device) via touch-sensitive display surface 41. The remaining functions are the same as compared to the exemplary embodiment in FIG. 3.

Figure 5:
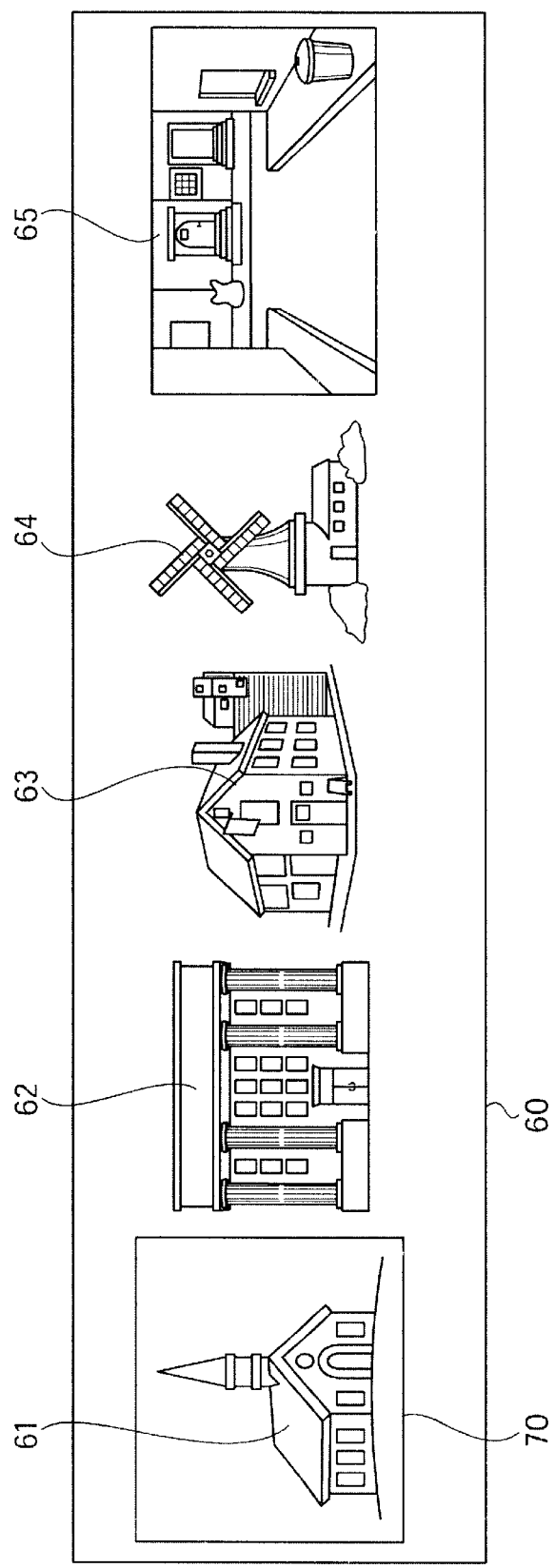
FIG. 5 shows a choice of displayed images, each representing one travel destination, and by the choice of which the travel destination can be determined.

FIG. 5 shows a display area 60 as illustrated in optical display 5. Here, optical display area 60 can occupy the entire area of optical display 5, or it can be displayed in only part of the area. Display area 60 shows a first image 61, a church, a second image 62, a large building, a third image 63, a residential building, a fourth image 64, a windmill, a fifth image 65, a street corner. There is a frame 70 around the first symbol 61. The frame can be displaced by operating push-buttons 3 and/or rotary knobs 4. If optical display 5 is designed as a touch screen monitor, displacing frame 70 is also possible by pressing touch-sensitive display surface 41. Frame 70, together with the image it surrounds, in this exemplary embodiment that being the first image 61, denotes that travel destination which has been selected as travel destination for the navigational device. Displacing frame 70, for instance, using push-buttons 3 or rotary knobs 4, makes possible a change of the travel destination, for example, to the travel destination represented by the fourth image 64, the windmill. In one example embodiment, after the change of frame 70, confirmation from a push-button 3 or a rotary knob 4 is required, in order to confirm the new travel destination resulting from such a change in travel destination.

In the first image 61, chosen here for a closer description, a church having a steeple is represented. From the shape of the steeple, for example, a driver can recognize again a church that he knows from pictures, or where he has been once before, and can select it as a travel destination, since the steeple is an individual, recognizable feature of the church, that is, of the travel destination. For this, he needs to know neither the name of the church nor the exact street. In an example embodiment, for this purpose, the first image 61 is stored as a photo in data form-in one of the memories assigned to navigational device 6, for instance, on data carrier 7 in the disc drive assigned to navigational device 6. The photo can, for instance have been taken with the aid of a digital camera. Pictures in data form can have been stored, for example, in pixel-based graphic formats on data carrier 7. An example of a pixel-based graphic format is, for example, the so-called bitmap. Also, for example, the following data formats are possible: GIF (Compuserve Graphic interchange Format), TIFF (Tagged Image File Format), PCX (Paintbrush), JPEG or MPG. Representation by vector-based formats, such as HGPL (HP Graphics Library) is also possible.

In another exemplary embodiment, the photo-realistic image data, after being taken, for instance, on a digital camera, are not stored directly on data carrier 7, but are first processed by a computer device, not shown in the drawing, having a graphics program, making change of image data possible. Through this processing, for example, it is possible to reduce the color depth of images, or just to maintain the outline of an object represented by the image, that is, to carry out a so-called outline extraction. Through this processing, it is possible to reduce the data volume of an image, and thereby to reduce the memory space requirement of an image, so that more images can be stored on data carrier 7. In so doing, one can generally maintain the individual qualities characterizing the travel destination, as, for instance, the church steeple in the first image 61, as a picture, by outline extraction or by reduction of color depth of images. This guarantees re-recognition by a user of the navigational device.

A plurality of images can be stored for one travel destination which have been taken at different times of the day, e.g., in the daytime or at night. A clock assigned to navigational device 6, not shown in the drawing, is available for time information in navigational device 6. In an exemplary embodiment, the estimated time of arrival at the travel destination is then used, in representing the travel destination, to display the travel destination according to the time of day of arrival, so that recognition of the travel destination as being the travel destination output on the optical display is made possible.

What is claimed is:

1. A device for inputting a travel destination into a navigation device, the navigation device for navigating a vehicle in a road network, the device for inputting comprising:

a memory unit storing a respective image of an external appearance for each of a plurality of possible travel destinations; and an optical display supporting a user in selecting the travel destination, each respective image being retrievable from the memory unit according to a predefined criteria and being displayed on the optical device after being retrieved, the travel destination being selected by the user by choosing one of the displayed images.

2. A device for inputting a travel destination into a navigational device, the navigational device for navigating a vehicle in a road network, the device for inputting comprising:

a memory unit storing a respective photo-realistic image of each of a plurality of possible travel destinations; and an optical display supporting a user in selecting the travel destination, each respective photo-realistic image being retrievable from the memory unit according to a predefined criteria and being displayed on the optical device after being retrieve, the travel destination being selected by the user by choosing one of the displayed images.

3. The device according to claim 1, wherein the optical display displays a plurality of the respective images simultaneously, the travel destination being selected by the user by choosing one of the plurality of respective images.

4. The device according to claim 1, wherein at least one of the respective images is supplemented by text information assigned to the corresponding one of the travel destinations and stored in the memory unit.

5. The device according to claim 1, wherein one of the criteria for retrieval is a predefined distance of a travel destination.

6. The device according to claim 1, wherein one of the criteria for retrieval is a travel destination belonging to a selectable category of travel destinations.

7. The device according to claim 1, wherein at least one of the respective images is at least partially retrievable via a radio connection.

8. The device according to claim 1, wherein at least one of the respective images is supplied using an exchangeable data carrier.

9. The device according to claim 1, wherein each respective image is simplified representation of the corresponding one of the plurality of possible travel destinations, each respective image having at least one individual, recognizable feature of a corresponding one of the plurality of possible travel destinations.

10. The device according to claim 1, wherein at least two images are stored for one of the possible travel destinations, the one of the possible travel destinations being shown in a different time of day in each of the at least two images, the optical display displaying one of the at least two images depending on a time of the display.

11. The device according to claim 1, wherein the respective images are stored in the memory unit in one of a vector-based data format and a pixel-based data format.

12. The device according to claim 10, wherein:

the one of the at least two images that is displayed shows the one of the possible travel destinations at a time of day of arrival.

* * * * *